(12) United States Patent
Kumano (10) Patent No.: US 8,794,904 B2
(45) Date of Patent: Aug. 5, 2014

(54) WATER WHEEL IMPELLER BLADE TYPE ELECTRIC POWER GENERATING APPARATUS

(75) Inventor: Katsuyuki Kumano, Tokyo (JP)

(73) Assignee: Japan System Planning Co., Ltd., Tokyo (JP)

( * ) Notice: Subject to any disclaimer, the term of this patent is extended or adjusted under 35 U.S.C. 154(b) by 623 days.

(21) Appl. No.: 13/101,399

(22) Filed: May 5, 2011

(65) Prior Publication Data

US 2011/0272946 A1    Nov. 10, 2011

(30) Foreign Application Priority Data

May 5, 2010 (JP) ................. 2010-106054
May 17, 2010 (JP) ................. 2010-112732
Jul. 29, 2010 (JP) ................. 2010-170678

(51) Int. Cl.
    *F03B 3/12* (2006.01)
(52) U.S. Cl.
    USPC ................. 415/7; 415/224; 416/86; 416/111; 416/119; 416/197 A
(58) Field of Classification Search
    CPC ................................................... F03B 17/065
    USPC ............ 415/7, 224; 416/84, 111, 119, 197 A, 416/86; 290/43, 54
    See application file for complete search history.

(56) References Cited

U.S. PATENT DOCUMENTS

| | | | |
|---|---|---|---|
| 302,769 A * | 7/1884 | Pallausch | 416/119 |
| 1,109,839 A * | 9/1914 | Henry | 415/7 |
| 1,265,114 A * | 5/1918 | Riddle | 416/112 |
| 5,051,059 A * | 9/1991 | Rademacher | 415/7 |

FOREIGN PATENT DOCUMENTS

| | | |
|---|---|---|
| EP | 2 128 436 | 12/2009 |
| EP | 2 133 557 | 12/2009 |
| GB | 2 190 144 | 11/1987 |
| JP | 55-40240 | 3/1980 |
| JP | 2003-307173 | 10/2003 |
| JP | 2003-314426 | 11/2003 |
| JP | 2005-330919 | 12/2005 |
| JP | 2009-228608 | 10/2009 |
| JP | 2010-151117 | 7/2010 |

OTHER PUBLICATIONS

United Kingdom Search Report and Examination Opinion issued Aug. 5, 2011 in Application No. GB1105824.5.

* cited by examiner

*Primary Examiner* — Ninh H Nguyen
(74) *Attorney, Agent, or Firm* — Wenderoth, Lind & Ponack, L.L.P.

(57) ABSTRACT

A water wheel impeller blade type electric power generating apparatus with which, on the forward motion side, the hydraulic pressure applied to the impeller blade is reduces, and the mud, sand, dirt, and the like will not be collected into the water wheel. The impeller blade is rotatably disposed on the rotor, and has a stopper part and a fluid receiving part extending from this stopper part and being longer than the stopper part, the fluid receiving part being provided with a length large enough that when the impeller blade is thrust down the fluid receiving part covers the stopper part of an adjacent impeller blade. To a top plate constituting a frame body of the apparatus, a fluid guide plate inclined inward being fixed for guiding the fluid to the impeller blades positioned under the rotating shaft of the rotor.

7 Claims, 11 Drawing Sheets

Fig. 11

WATER WHEEL IMPELLER BLADE TYPE ELECTRIC POWER GENERATING APPARATUS

BACKGROUND OF THE INVENTION

1. Field of the Invention

The present invention relates to a water wheel impeller blade type electric power generating apparatus using a water stream, a seawater current or the like in, for example, a river or the sea to generate hydroelectric power.

2. Field of the Related Art

As the water wheel impeller blade type electric power generating apparatus, the applicant of the present application has proposed one having a structure as shown in FIG. 17 and FIG. 18 in Patent Document 1. This structure includes a rotating shaft for transmitting motive power to the power generator, a rotor fixed to this rotating shaft, and impeller blades which are provided on the outer periphery of this rotor for rotating said rotor by receiving a flow of fluid. In addition, under said rotor, a fluid passage frame body is provided such that a fluid passage is formed, and said impeller blades have a fluid receiving part and a stopper part shorter than this fluid receiving part, being formed in the shape of a letter L, and are rotatably disposed on said rotor such that, when said fluid receiving part is exposed to the fluid pressure in said fluid passage, said stopper part can maintain erection of said fluid receiving part.

For the outer periphery of said rotor, the blade passage frame body is provided such that it surrounds the rotor without hindering the rotation of said impeller blade. Said fluid receiving part is provided with a weight on the surface opposite to the fluid receiving one, or said fluid receiving part is comprised of a fluid receiving portion as the base, and a weight fixed to the distal end thereof. The outer periphery of said rotor is contoured such that, outside the area where the distal end of the fluid receiving part is butted against the outer periphery is formed in the shape of a circular arc with a thickness larger than that of the area where the rotating support shaft for said impeller blade is provided, and further, in the surface of the rotor, a concave is formed in the shape of a circular arc on the side of the stopper part.

Patent Document 1: Japanese Patent Application No. 2009-104591 (Japanese Patent Laid-Open Publication No. 2010-151117)

The water wheel impeller blade type electric power generating apparatus as disclosed in Patent Document 1, which having a structure as shown in FIG. 17 and FIG. 18, features that, because the fluid flows under the water wheel (including the rotor and the impeller blades), the mud, sand, dirt, and the like in the river will not be collected into the water wheel. In addition, because the impeller blade is thrust down on the backward motion side, the resistance is reduced during the backward motion. Further, the impeller blade mounting surface of the rotor is contoured in the shape of a circular arc in order to reduce the fluid resistance, and further a concave in the shape of a circular arc is formed on the stopper part side in order to facilitate the erection of the impeller blade. Furthermore, the fluid receiving part of the impeller blade is provided with a weight on the surface opposite to the fluid receiving one, or a weight is fixed at the distal end of the fluid receiving portion. Thus, the rotor and the impeller blade have a complicated structure, increasing the manufacturing cost.

It is an object of the present invention to provide a water wheel impeller blade type electric power generating apparatus with which, on the forward motion side, the hydraulic pressure applied to the impeller blade is reduced; the mud, sand, dirt, and the like will not be collected into the water wheel; the manufacturing cost for the apparatus can be reduced; and further by utilizing the buoyancy force of the fluid, the load imposed on the bearings which pivotally support the rotor is reduced or practically eliminated, whereby heat generation of and damage to the bearings are prevented, and the fluid energy loss is reduced to allow improving the durability and the power generation efficiency.

SUMMARY OF THE INVENTION

According to a first aspect of the invention, there can be provided a water wheel impeller blade type electric power generating apparatus comprising:

a rotating shaft for transmitting motive power to a power generator, a rotor fixed to this rotating shaft, and an impeller blade provided on the outer periphery of this rotor to receive a flow of fluid for rotating said rotor, said impeller blade being rotatably disposed on said rotor, and having a stopper part and a fluid receiving part extending from this stopper part and being longer than the stopper part, said fluid receiving part being provided with a length large enough to cover the stopper part of the impeller blade given on the thrust down side upon the impeller blade being thrust down, and to a top plate constituting a frame body of the apparatus, a fluid guide plate inclined inward being fixed for guiding the fluid to the impeller blades positioned under the rotating shaft of said rotor.

According to a second aspect of the invention, there can be provided the water wheel impeller blade type electric power generating apparatus as stated in the first aspect, wherein said fluid receiving part is provided with a fluid receiving surface concaved in the shape of a circular arc, a letter V, or a trapezoid.

According to a third aspect of the invention, there can be provided the water wheel impeller blade type electric power generating apparatus as stated in the first aspect, wherein said rotor includes a drum body and a side plate fixed to each of both sides of this drum body, said drum body is constituted by a plurality of trays each accommodating a support shaft, the impeller blade being mounted thereon, said tray includes side plate fixing parts folded from a bottom plate in the shape of a rectangle, the side plate fixing parts being fixed to the side plates, and tray fixing parts folded from said bottom plate, the tray fixing parts being fixed to the respective adjacent trays, and said side plate fixing part is fixed to said side plate and said tray fixing part is fixed to the adjacent tray fixing part with bolts and nuts, respectively.

According to a fourth aspect of the invention, there can be provided a water wheel impeller blade type electric power generating apparatus comprising:

a rotating shaft pivotally supported by a frame body through bearings, transmitting motive power to a power generator;

a drum body having a shape like a cage, the drum body being constituted by a plurality of trays each accommodating a support shaft, an impeller blade being mounted thereon, and the plurality of trays being connected to one another;

a rotor having a side plate pivotally supporting a support shaft, the side plate being fixed to both sides of this drum body, and the rotor being fixed to said rotating shaft in a coaxial arrangement; and a plurality of impeller blades being provided on the outer periphery of this rotor for rotating said rotor by receiving a flow of fluid, and being pivotally supported by said respective support shafts, inside said rotor, a hollow hermetically sealed structure being disposed integrally connected with said rotating shaft for developing a buoyancy force due to the fluid.

According to a fifth aspect of the invention, there can be provided a water wheel impeller blade type electric power generating apparatus comprising:

a rotating shaft pivotally supported by a frame body through bearings, transmitting motive power to a power generator;

a drum body having a shape like a cage, the drum body being constituted by a plurality of trays each accommodating a support shaft, an impeller blade being mounted thereon, and the plurality of trays being connected to one another;

a rotor having a side plate pivotally supporting a support shaft, the side plate being fixed to both sides of this drum body, and the rotor being fixed to said rotating shaft in a coaxial arrangement; and a plurality of impeller blades having a stopper part and a fluid receiving part extending from this stopper part and being longer than the stopper part, said fluid receiving part being provided with a length large enough to cover the stopper part of the impeller blade given on the thrust down side upon the impeller blade being thrust down, and the plurality of impeller blades being rotatably disposed on the outer periphery of said rotor for rotating said rotor by receiving a flow of fluid, inside said rotor, a hollow hermetically sealed structure being disposed integrally connected with said rotating shaft, the hollow hermetically sealed structure being provided with a volume for causing the fluid to exert a buoyancy force equivalent to the total load imposed by rotating elements including the rotor and the impeller blades.

According to a sixth aspect of the invention, there can be provided the water wheel impeller blade type electric power generating apparatus as stated in the fourth or fifth aspects, wherein said fluid receiving part has a fluid receiving surface concaved in the shape of a circular arc, a letter V or a trapezoid.

According to a seventh aspect of the invention, there can be provided a water wheel impeller blade type electric power generating apparatus comprising:

a rotating shaft pivotally supported by a frame body through bearings, transmitting motive power to a power generator;

a rotor having a hollow drum body and a side plate fixed to both sides of this drum body, respectively, said drum body being provided with opening parts for allowing fluid to flow therein, and the rotor being fixed to said rotating shaft in a coaxial arrangement; and an impeller blade provided on the outer periphery of this rotor to receive a flow of fluid for rotating said rotor, inside said rotor, a hollow hermetically sealed structure being disposed integrally connected with said rotating shaft for developing a buoyancy force due to the fluid.

According to an eighth aspect of the invention, there can be provided a water wheel impeller blade type electric power generating apparatus comprising:

a rotating shaft pivotally supported by a frame body through bearings, transmitting motive power to a power generator;

a rotor having a hollow drum body and a side plate fixed to both sides of this drum body, respectively, said drum body being provided with opening parts for allowing fluid to flow therein, and the rotor being fixed to said rotating shaft in a coaxial arrangement; and a plurality of impeller blades having a stopper part and a fluid receiving part extending from this stopper part and being longer than the stopper part, said fluid receiving part being provided with a length large enough to cover the stopper part of the impeller blade given on the thrust down side upon the impeller blade being thrust down, and the plurality of impeller blades being rotatably disposed on the outer periphery of said rotor for rotating said rotor by receiving a flow of fluid, inside said rotor, a hollow hermetically sealed structure being disposed integrally connected with said rotating shaft, the hollow hermetically sealed structure being provided with a volume for causing the fluid to exert a buoyancy force equivalent to the total load imposed by rotating elements including the rotor and the impeller blades.

According to a ninth aspect of the invention, there can be provided the water wheel impeller blade type electric power generating apparatus as stated in the seventh or eighth aspects, wherein said fluid receiving part has a fluid receiving surface concaved in the shape of a circular arc, a letter V or a trapezoid.

Advantageous Effects of the Invention

According to the inventive concept of the first aspect of the invention, the fluid receiving part is longer and heavier than the stopper part, thus the impeller blades positioned above the rotating shaft are naturally thrust down by their own weight. In other words, when the impeller blade is thrust down, the fluid receiving area provided for the impeller blade is substantially reduced, whereby, on the backward motion side, the resistance of the impeller blade to the fluid is reduced. In addition, when the impeller blade is thrust down, the fluid receiving part covers the stopper part and the lower portion of the fluid receiving part of the subsequent impeller blade, being butted against the stopper part thereof. This also reduces the resistance of the impeller blade to the fluid on the backward motion side. The fluid guide plate will cause the fluid to flow under the rotor, whereby the mud, sand, dirt, and the like in the river will not be collected into the water wheel (including the rotor and the impeller blades). In addition, the rotor is constituted by components having simple geometries, and further, the stopper part and the fluid receiving part can be manufactured as an integral part, thus the apparatus allows a substantial reduction in cost.

According to the inventive concept of the second aspect of the invention, the fluid receiving part can be provided with a fluid receiving surface concaved in the shape of a circular arc, whereby the fluid receiving part can receive a larger volume of fluid when the fluid receiving part is erected with the stopper part being butted against the drum body of the rotor.

According to the inventive concept of the third aspect of the invention, with the tray, the side plate fixing part is fixed to the side plate, and the adjacent tray fixing parts are fixed to each other, whereby the tray has an increased strength, and can sufficiently withstand the hydraulic pressure. In addition, the side plate fixing part and the tray fixing part are produced by folding the edge portions of a plate, whereby the tray can be manufactured inexpensively with no need for making a complicated machining operation. Further, the tray and the side plate, and the adjacent trays are fixed to each other by using bolts and nuts. In other words, any stainless steel materials, if welded, will be deteriorated having red rust due to the composition change, but the present trays made of stainless steel are fixed by using bolts and nuts rather than by welding, thus they will be free from oxidation deterioration.

According to the inventive concept of the fourth aspect of the invention, on the basis of the configuration in which the rotor includes a drum body having a shape like a cage and both side plates, and inside of this rotor, a hollow hermetically sealed structure which is integrally connected with the rotating shaft for developing a buoyancy force due to the fluid is disposed, the buoyancy force of the fluid that is applied to the hermetically sealed structure can be utilized to reduce or practically eliminate the load imposed on the bearings by the rotor and the impeller blades, thereby preventing heat generation of and damage to the bearings, and reducing the fluid energy loss to allow improving the durability and the power generation efficiency.

According to the inventive concept of the fifth aspect of the invention, on the basis of the configuration in which the rotor includes a drum body having a shape like a cylindrical cage and both side plates, and inside of this rotor, a hollow hermetically sealed structure in the shape of a cylindrical drum that is integrally connected with the rotating shaft, having a volume which causes the fluid to exert a buoyancy force equivalent to the total load imposed by the rotor and impeller blades, the buoyancy force of the fluid that is applied to the hermetically sealed structure can be utilized to reduce or practically eliminate the load imposed on the bearings by the rotor and impeller blades, thereby preventing heat generation of and damage to the bearings, and reducing the fluid energy loss to allow improving the durability and the power generation efficiency, and on the basis of the configuration in which the construction of the impeller blade is the same as that with the first aspect of the invention, whereby the advantageous effects as those with the scheme on claim 1 can also be provided.

According to the inventive concept of the sixth aspect of the invention, the fluid receiving part is provided with a fluid receiving surface concaved in the shape of a circular arc, a letter V, or a trapezoid in addition to the inventive concept of the fourth or fifth aspects of the invention, whereby the advantageous effects as those with the inventive concepts can also be provided, and further the fluid receiving part can receive a larger volume of fluid when the fluid receiving part is erected with the stopper part being butted against the drum body of the rotor.

According to the inventive concept of the seventh aspect of the invention, on the basis of the configuration in which, inside the rotor which includes a hollow drum body and both side plates, and which allows the fluid to flow therein, a hollow hermetically sealed structure which is integrally connected with the rotating shaft for developing a buoyancy force due to the fluid is disposed, the buoyancy force of the fluid that is applied to the hermetically sealed structure can be utilized to reduce or practically eliminate the load imposed on the bearings by the rotor and the impeller blades, thereby preventing heat generation of and damage to the bearings, and reducing the fluid energy loss to allow improving the durability and the power generation efficiency.

According to the inventive concept in the eighth aspect of the invention, on the basis of the configuration in which, inside the rotor which includes a hollow drum body and both side plates, and which allows the fluid to flow therein, a hollow hermetically sealed structure in the shape of a cylindrical drum that is integrally connected with the rotating shaft, having a volume which causes the fluid to exert a buoyancy force equivalent to the total load imposed by the rotor and impeller blades, the buoyancy force of the fluid that is applied to the hermetically sealed structure can be utilized to reduce or practically eliminate the load imposed on the bearings by the rotor and impeller blades, thereby preventing heat generation of and damage to the bearings, and reducing the fluid energy loss to allow improving the durability and the power generation efficiency, and on the basis of the configuration in which the construction of the impeller blade is the same as that with the inventive concept of the first aspect of the invention, whereby the same advantageous effects as those with the inventive concept of the first aspect can also be provided.

According to the inventive concept of the ninth aspect of the invention, in addition to the inventive concept in seventh or eighth aspects, the fluid receiving part is provided with a fluid receiving surface concaved in the shape of a circular arc, a letter V, or a trapezoid, whereby the advantageous effects as those with the inventive concept of the seventh or eighth aspects can also be provided, and further the fluid receiving part can receive a larger volume of fluid when the fluid receiving part is erected with the stopper part being butted against the drum body of the rotor.

DETAILED DESCRIPTION OF THE PREFERRED EMBODIMENTS

Figure 3:
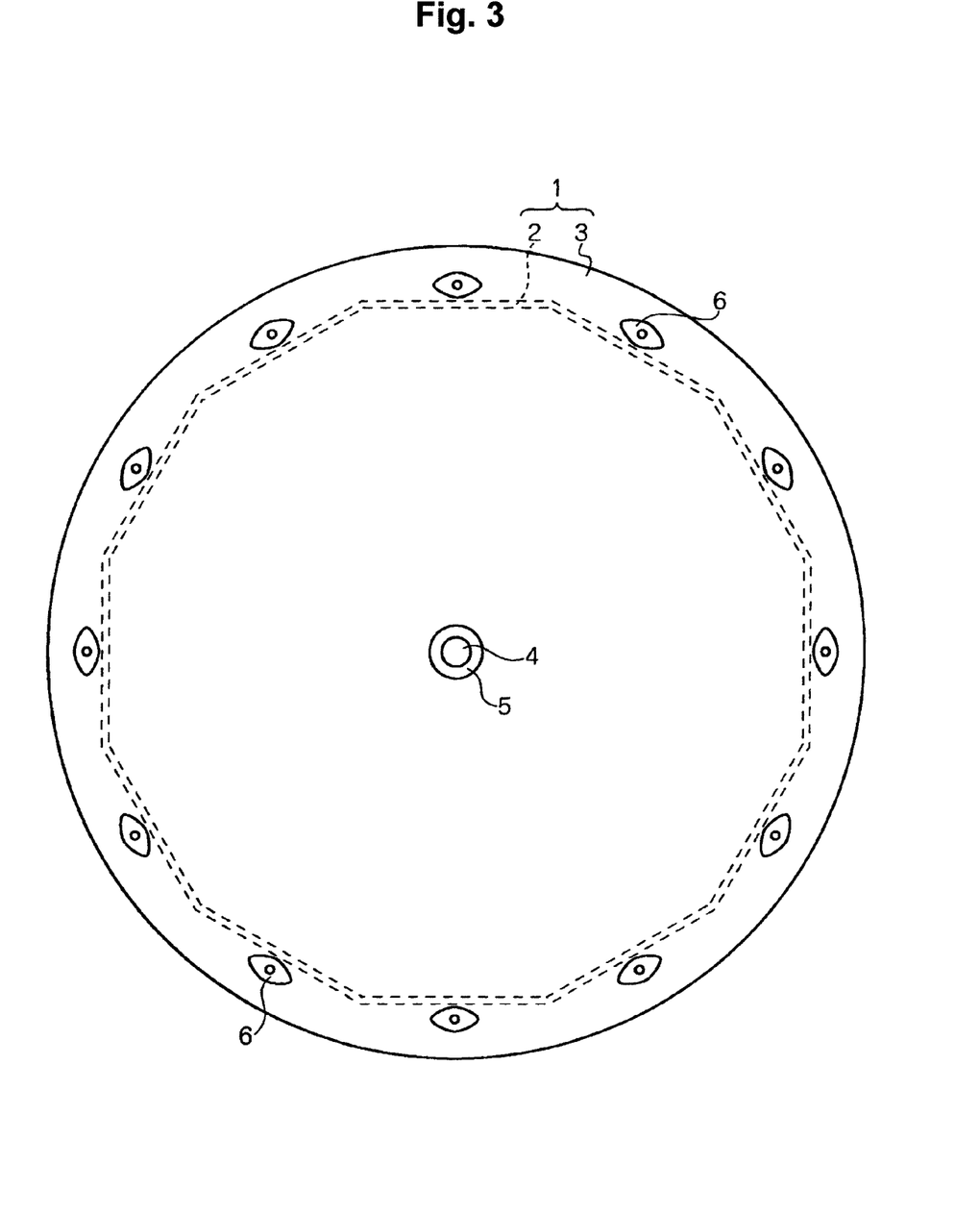
FIG. 3 is a side view of a rotor of the water wheel impeller blade type electric power generating apparatus.
Figure 4:
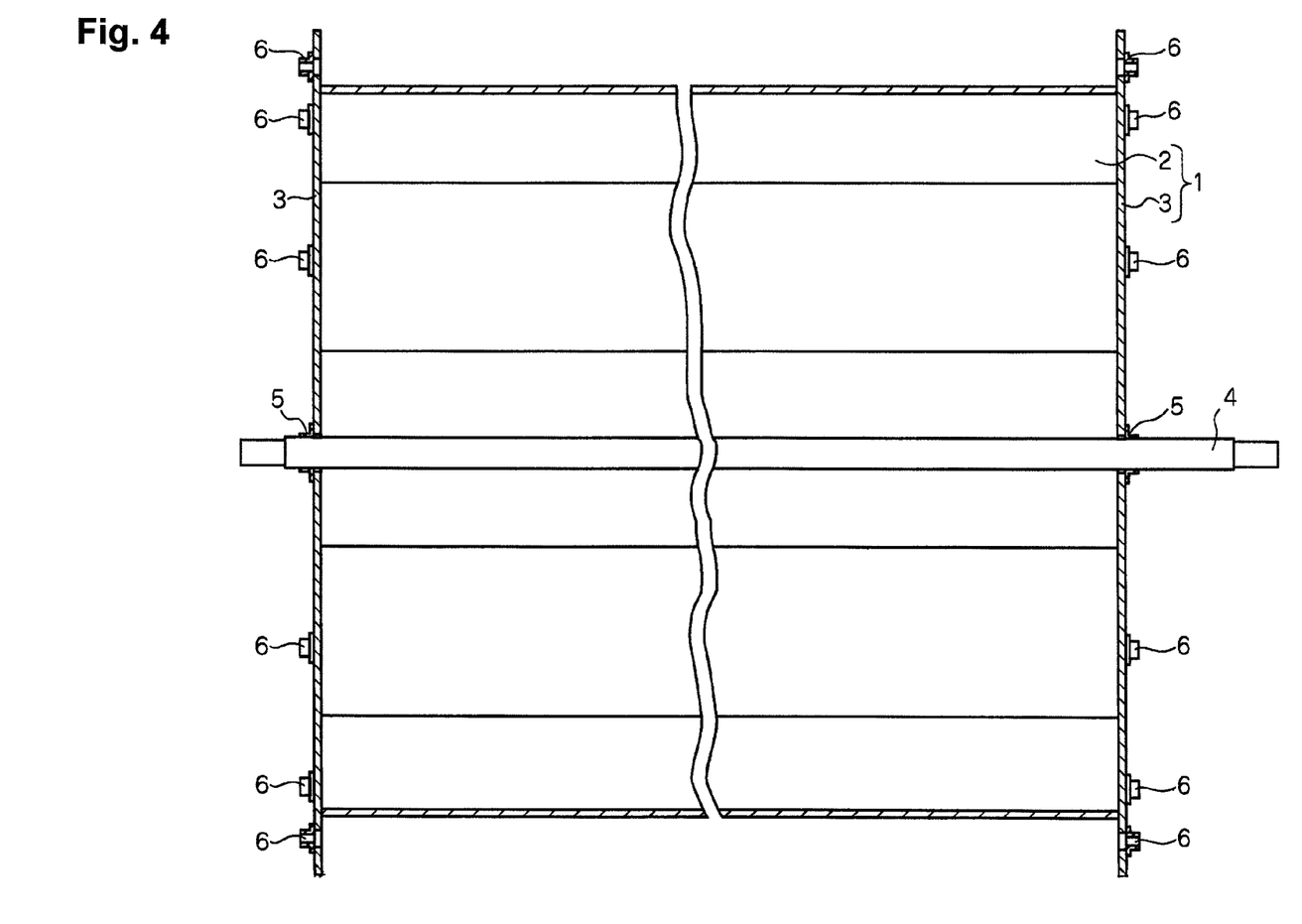
FIG. 4 is a sectional view of the rotor.

A water wheel impeller blade type electric power generating apparatus according to a first embodiment of the present invention will be described with reference to the accompanying drawings. As shown in FIG. 3 and FIG. 4, a rotor 1 is comprised of a drum body 2 which has an outer periphery formed in the shape of a dodecahedron, and a side plate 3 which is fixed to each of both sides of this drum body 2, the outside diameter of the side plate 3 being larger than that of the drum body 2. The side plate 3 is fixed to a rotating shaft 4 by means of a fixing member 5. In the portion which is projected upward from the drum body 2 of the side plate 3, a bearing 6 is fixed in twelve places corresponding to the respective sides of the dodecahedron.

Figure 1:
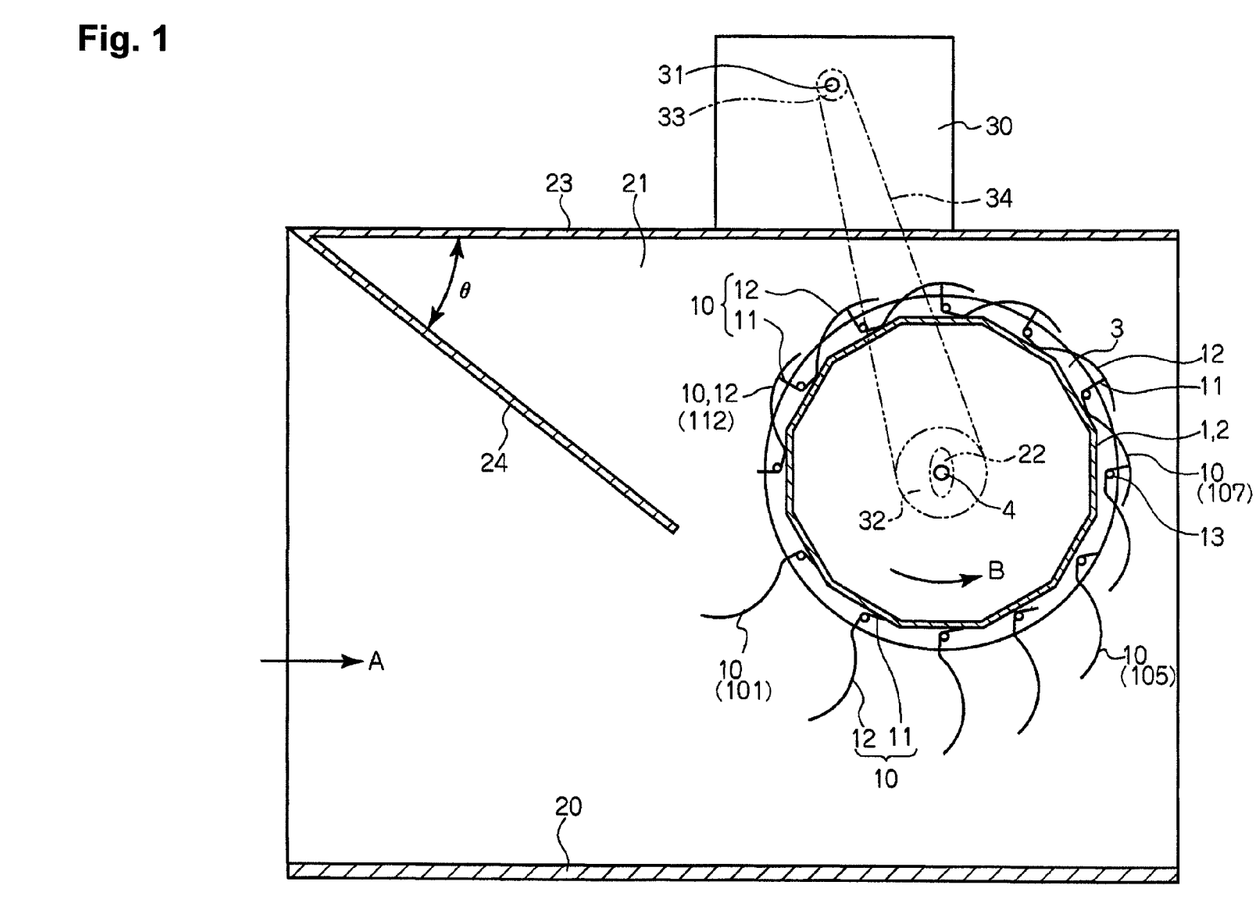
FIG. 1 is a sectional view illustrating the schematic configuration of a water wheel impeller blade type electric power generating apparatus according to a first embodiment of the present invention.
Figure 5:
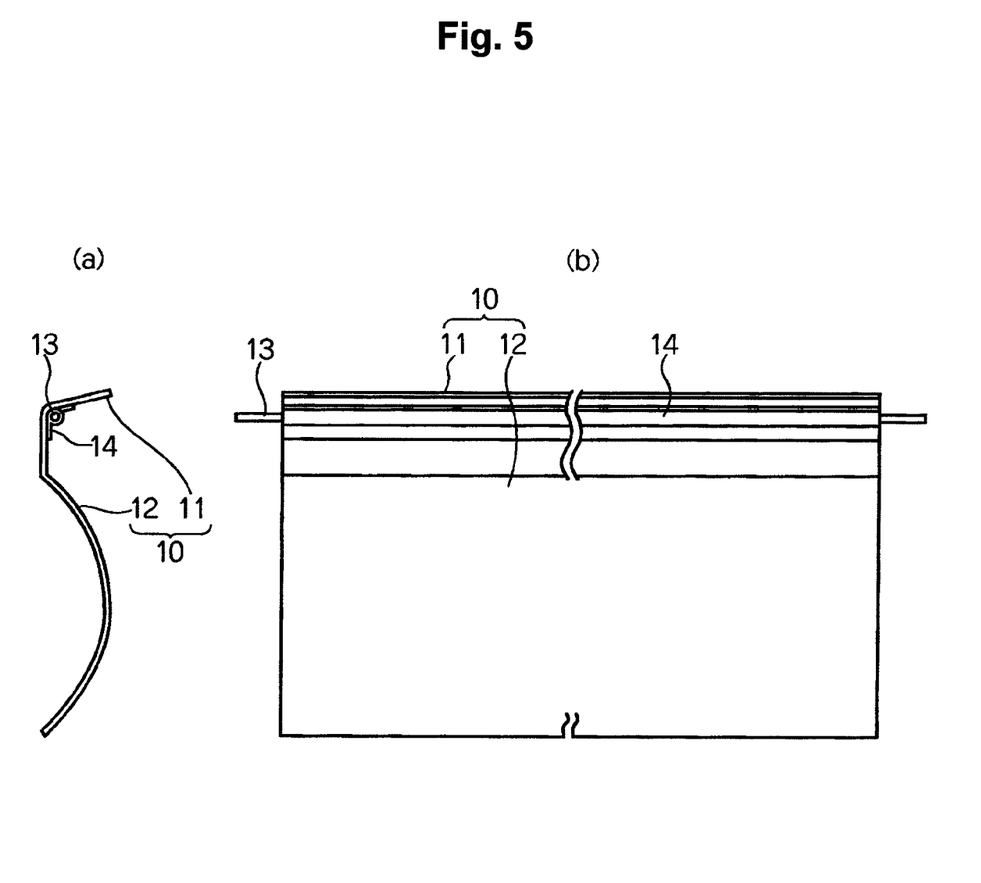
FIG. 5A is side view of an impeller blade of the water wheel impeller blade type electric power generating apparatus.
FIG. 5B is a front view thereof.

To the rotor 1, an impeller blade 10 as shown in FIG. 5 is mounted. The impeller blade 10 is comprised of a stopper part 11, and a fluid receiving part 12 which extends from this stopper part 11, being longer than the stopper part 11, and is fixed to a support shaft 13 by means of a fixing member 14. Both end parts of the support shaft 13 are rotatably supported by means of said bearings 6 which are disposed oppositely to each other. The fluid receiving surface of the fluid receiving part 12 is concaved in the shape of a circular arc such that it can receive a larger volume of fluid when the fluid receiving part 12 is erected with the stopper part 11 being butted against the drum body 2 of the rotor 1. As shown in FIG. 1, the fluid receiving part 12 is provided with a length large enough to cover the stopper part 11 and the lower portion of the fluid receiving part 12 of the impeller blade 10 given on the thrust down side when the impeller blade 10 is thrust down.

Figure 2:
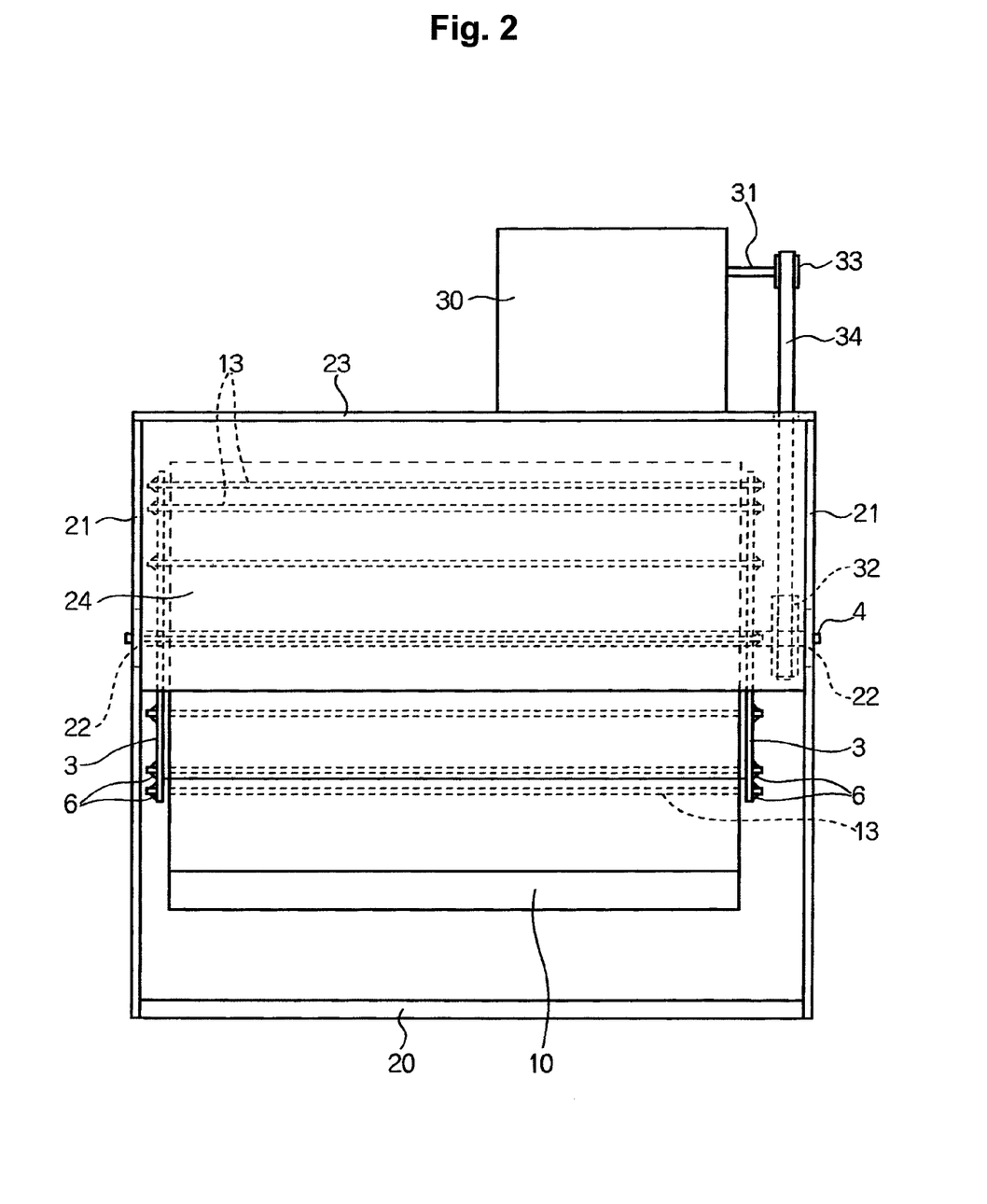
FIG. 2 is a front view of the water wheel impeller blade type electric power generating apparatus.

As shown in FIG. 1 and FIG. 2, the rotating shaft 4 of the rotor 1 to which the impeller blades 10 are mounted is rotatably supported by means of a side plate 21 which is fixed on both sides of a bottom plate 20, through a bearing 22. On both side plates 21, a top plate 23 is fixed. In other words, the bottom plate 20, side plate 21 and top plate 23 constitute a frame body of the apparatus. To the front end part of the top plate 23, a fluid guide plate 24 is fixed. Herein, the fluid guide plate 24 is provided with a length and inclination angle large enough to guide the fluid flowing in the direction A to the impeller blades 10 positioned under the rotating shaft 4.

Above the top plate 23, a generator 30 is fixed such that an input shaft 31 of the generator 30 is in parallelism with the rotating shaft 4. To one end part of the rotating shaft 4 and the input shaft 31, a gear 32, 33 is fixed, respectively, and the gears 32, 33 are connected by a chain 34.

Next, the function of the water wheel impeller blade type electric power generating apparatus according to the first embodiment will be described. Once the present apparatus is fixed in place underwater or undersea such that the fluid guide plate 24 faces the flowing direction of fluid flow, A, the fluid guided by the fluid guide plate 24 and the fluid flowing under the fluid guide plate 24 are butted against the fluid receiving part 12 of the impeller blades 10 (101 to 105) positioned under the rotating shaft 4, resulting in the rotor 1 and the rotating shaft 4 being rotated in the direction of arrow B. The rotation of the rotating shaft 4 is transmitted to the input shaft 31 through the gears 32, 33 and the chain 34, thereby the generator 30 generating electric power.

The fluid receiving part 12 is longer and heavier than the stopper part 11, thus the impeller blades 10 (107 to 112) positioned above the rotating shaft 4 are naturally thrust down by their own weight. In other words, when the impeller blade 10 is thrust down, the fluid receiving area for the impeller blade 10 is substantially reduced, whereby, on the backward motion side, the resistance of the impeller blade 10 to the fluid is reduced. In addition, when the impeller blade 10 is thrust down, the fluid receiving part 12 covers the stopper part 11 and the lower portion of the fluid receiving part 12 of the subsequent impeller blade 10, being butted against the stopper part 11 thereof. This also reduces the resistance of the impeller blade 10 to the fluid on the backward motion side.

In addition to the above-mentioned advantageous effects, the present apparatus exerts the following ones. The fluid guide plate 24 will cause the fluid to flow under the rotor 1, whereby the mud, sand, dirt, and the like in the river will not be collected into the water wheel (including the rotor 1 and the impeller blades 10). In addition, the rotor 1 is constituted by components having simple geometries, and further, the stopper part 11 and the fluid receiving part 12 can be manufactured as an integral part, thus the apparatus allows a substantial reduction in manufacturing cost.

FIG. 6A and FIG. 6B illustrate a tray and an assembly of trays constituting the drum body, respectively. The above description of the first embodiment has been made on the assumption that the drum body is a dodecahedron made of a stainless steel plate. In other words, the first embodiment constitutes a drum body 2 with twelve trays 40. The tray 40 is comprised of side plate fixing parts 42 which are produced by folding, at right angles, the edge portions on the shorter side of a bottom plate 41 in the shape of a rectangle such that they can be fixed to the side plates 3, and tray fixing parts 43 which are produced by folding the edge portions on the longer side of the bottom plate 41 at an angle with an inclination toward the outside such that they can be fixed to the respective adjacent trays 40. In the side plate fixing part 42, a plurality of bolt insertion holes 44 for fixing it to the side plate 3 with bolts and nuts, and a support shaft insertion hole 45 for inserting the support shaft 13 are formed. Also in the tray fixing part 43, a plurality of bolt insertion holes 46 for fixing the adjacent trays 40 to each other with bolts and nuts are formed. Although it is not shown, in the side plate 3, bolt insertion holes corresponding to the bolt insertion holes 44 are formed. In addition, the bearing 6 which is fixed to the side plate 3 is formed such that it can accommodate the support shaft insertion hole 45 when the tray 40 is fixed to the side plate 3.

Next, how to assemble the drum body 2 will be described. The bolt insertion hole 44 in the side plate fixing part 42 of the tray 40 is aligned to a bolt insertion hole in the side plate 3, and a bolt is inserted into the bolt insertion hole 44 in the side plate fixing part 42 and a bolt insertion hole in the side plate 3 to be fixed with a nut. In this way, the twelve trays 40 are fixed to the side plates 3. Thereafter, a bolt is inserted into the respective bolt insertion holes 46 in the respective adjacent trays 40 to be fixed with a nut. Thereby, the twelve trays 40 are fixed to the side plates 3, and the respective adjacent trays 40 are fixed to one another to constitute a rotor 1. Thereafter, the support shaft 13 is inserted into the support shaft insertion holes 45 in the tray 40, and the bearing 6 is mounted to each end of the support shaft 13 and is fixed to the side plate 3. Then, as shown in FIG. 5, the impeller blade 10 is fixed to the support shaft 13 by means of the fixing member 14.

Thus, the drum body 2 is constituted by the twelve trays 40 which each accommodate the support shaft 13 to which the impeller blade 10 is mounted, and in the tray 40, the side plate fixing part 42 to be fixed to the side plate 3 and the tray fixing part 43 to be fixed to the adjacent tray 40 are formed. In other words, with the tray 40, the side plate fixing part 42 is fixed to the side plate 3, and the adjacent tray fixing parts 43 are fixed to each other, whereby the tray 40 has an increased strength, and can sufficiently withstand the hydraulic pressure. In addition, the side plate fixing part 42 and the tray fixing part 43 are produced by folding the edge portions of a plate, whereby the tray 40 can be manufactured inexpensively with no need for making a complicated machining operation. Further, the tray 40 and the side plate 3, and the adjacent trays 40 are fixed to each other by using bolts and nuts. In other words, any stainless steel materials, if welded, will be deteriorated having red rust due to the composition change, but the present trays made of stainless steel are fixed by using bolts and nuts rather than by welding, thus they will be free from oxidation deterioration.

The size of the present apparatus is not a characteristic element of the present invention, and thus with the present invention, it is not defined, however, the inventor experimentally manufactured a prototype having the following size. Hereinbelow, only the principal dimensions will be given. The outside diameter of the drum body 2 was 100 cm, and the length across both side plates 3 was 180 cm. The main dimensions of the impeller blade 10 were as follows: the stopper part 11 was 8 cm long; the fluid receiving part 12 was 40 cm long; the stopper part 11 and the fluid receiving part 12 were 175 cm wide, and 2 mm thick; the angle formed between the stopper part 11 and the straight line portion of the fluid receiving part 12 was 102.27 deg. The fluid guide plate 24 was manufactured such that it had an angle θ of 35.47 deg with respect to the top plate 23 and a length of 160 cm. Since the present apparatus is installed underwater or underseas, almost all members were made of stainless steel, which is difficult to be corroded. Experiment using the present apparatus thus manufactured underwater showed an extremely good result.

Figure 7:
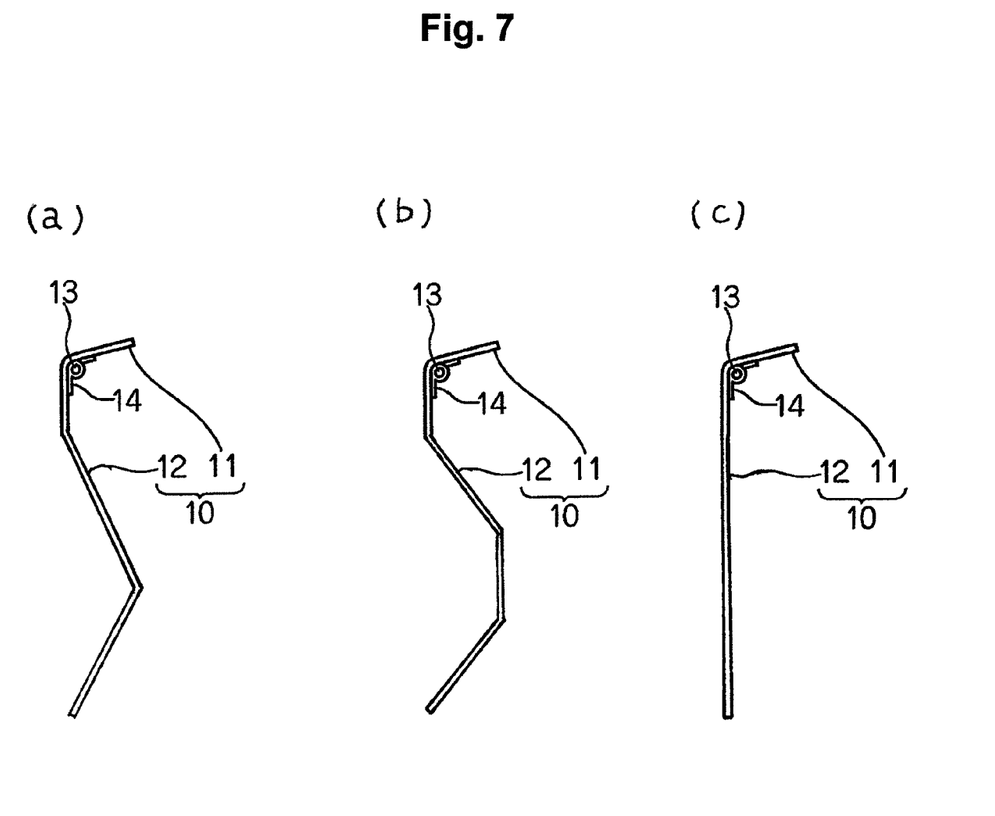
FIG. 7A, FIG. 7B, and FIG. 7C are a side view of a modification of the impeller blade, respectively.

FIG. 7 illustrates other modifications of the impeller blade 10. With the impeller blade 10 (see FIG. 5) in the first embodiment, the fluid receiving surface of the fluid receiving part 12 is concaved in the shape of a circular arc. In FIG. 7A, the fluid receiving surface is concaved in the shape of a letter V, while, in FIG. 7B, the fluid receiving surface is concaved in the shape of a trapezoid. Even with such geometries, the impeller blades 10 shown in FIG. 7A and FIG. 7B are preferable because they can receive as large a volume of fluid as the impeller blade in the first embodiment. In FIG. 7C, the fluid receiving surface of the fluid receiving part 12 is adapted to be in the shape of a flat plane. In this case, the same advantageous effect as that with the impeller blades shown in FIG. 5, FIG. 7A, and FIG. 7B will not be exerted, but the other advantageous effects with the present apparatus will be assured.

In the first embodiment, on the assumption that the drum body 2 has twelve faces, twelve impeller blades 10 are provided, however, the number of impeller blades 10 is not specifically defined. In addition, the drum body 2 may be formed in the shape of a circle rather than a square. The angle θ of the fluid guide plate 24 with respect to the top plate 23 is preferably 30 to 45 deg.

Next, with reference to FIG. 8, FIG. 9 and FIG. 10, a water wheel impeller blade type electric power generating apparatus according to a second embodiment of the present invention will be described.

Figure 8:
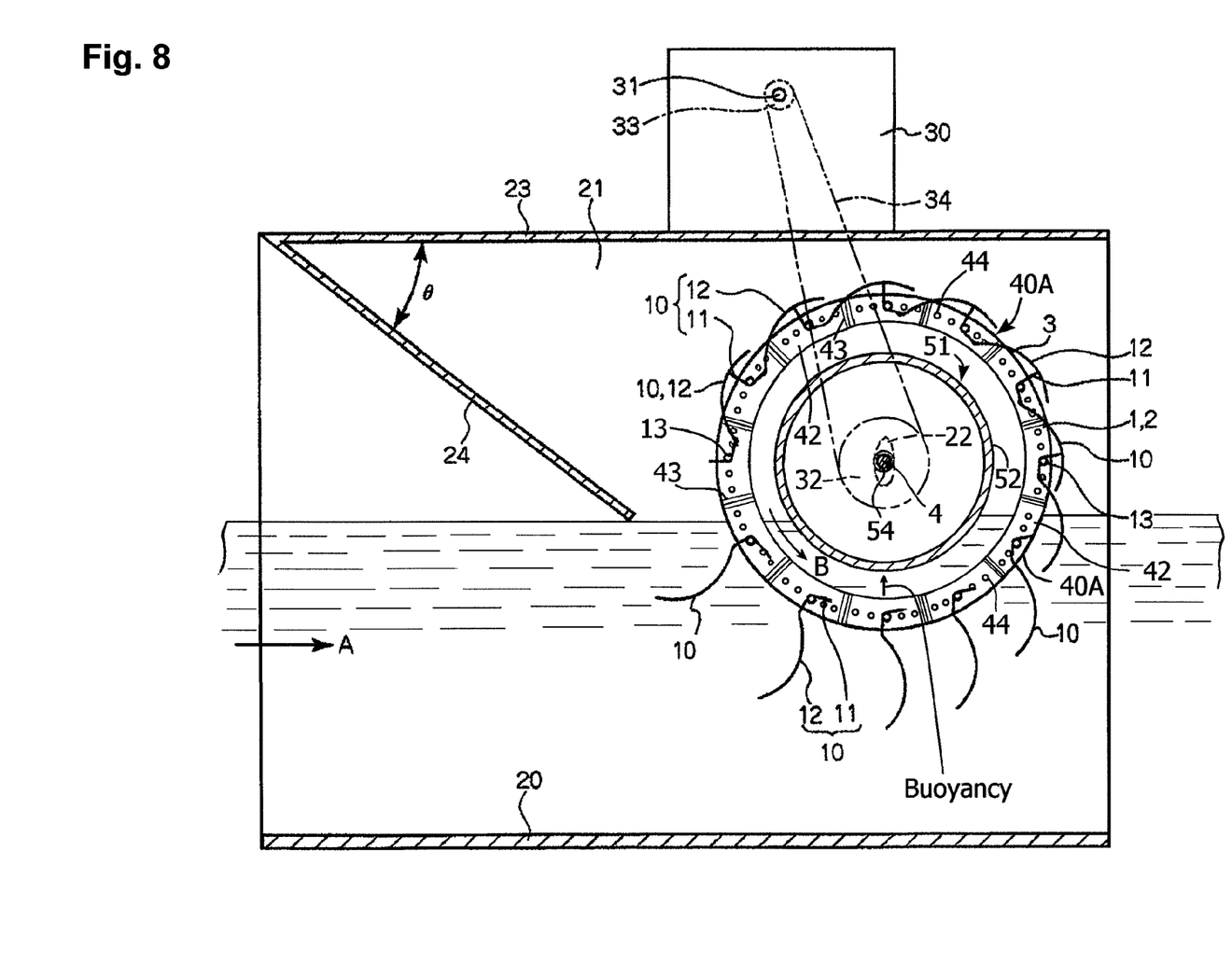
FIG. 8 is a sectional view illustrating the schematic configuration of a water wheel impeller blade type electric power generating apparatus according to a second embodiment of the present invention.

In FIG. 8, which illustrates the water wheel impeller blade type electric power generating apparatus according to the second embodiment, the same components as those of the above-described water wheel impeller blade type electric power generating apparatus according to the first embodiment will be provided with the same symbols, and the detailed explanation of those will be omitted.

Figure 6:
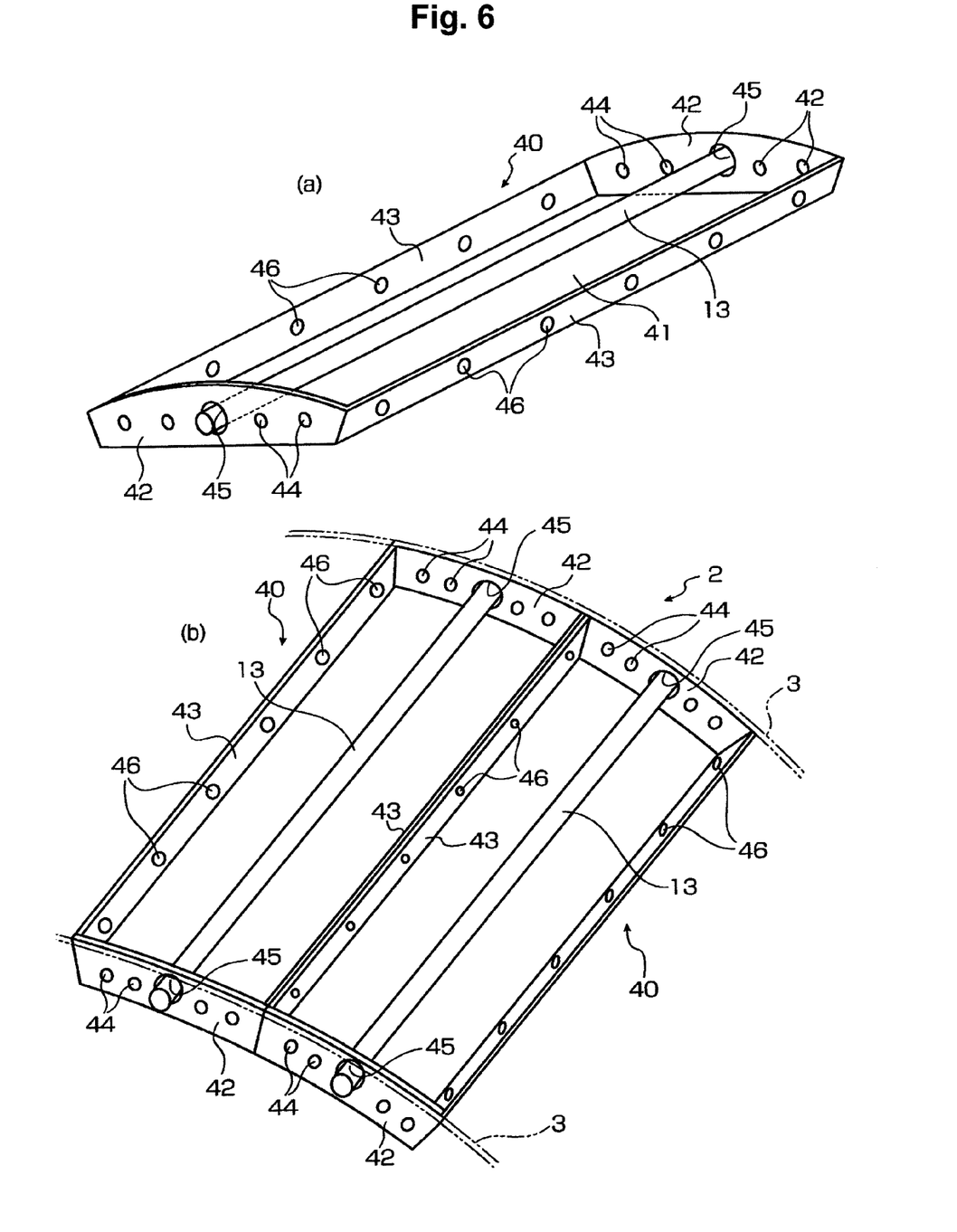
FIG. 6A and FIG. 6B illustrate a tray and an assembly of trays constituting a drum body of the water wheel impeller blade type electric power generating apparatus, respectively, FIG. 6A being a perspective view of the tray constituting the drum body and FIG. 6B being a perspective view of the assembly of trays constituting the drum body.
Figure 9:
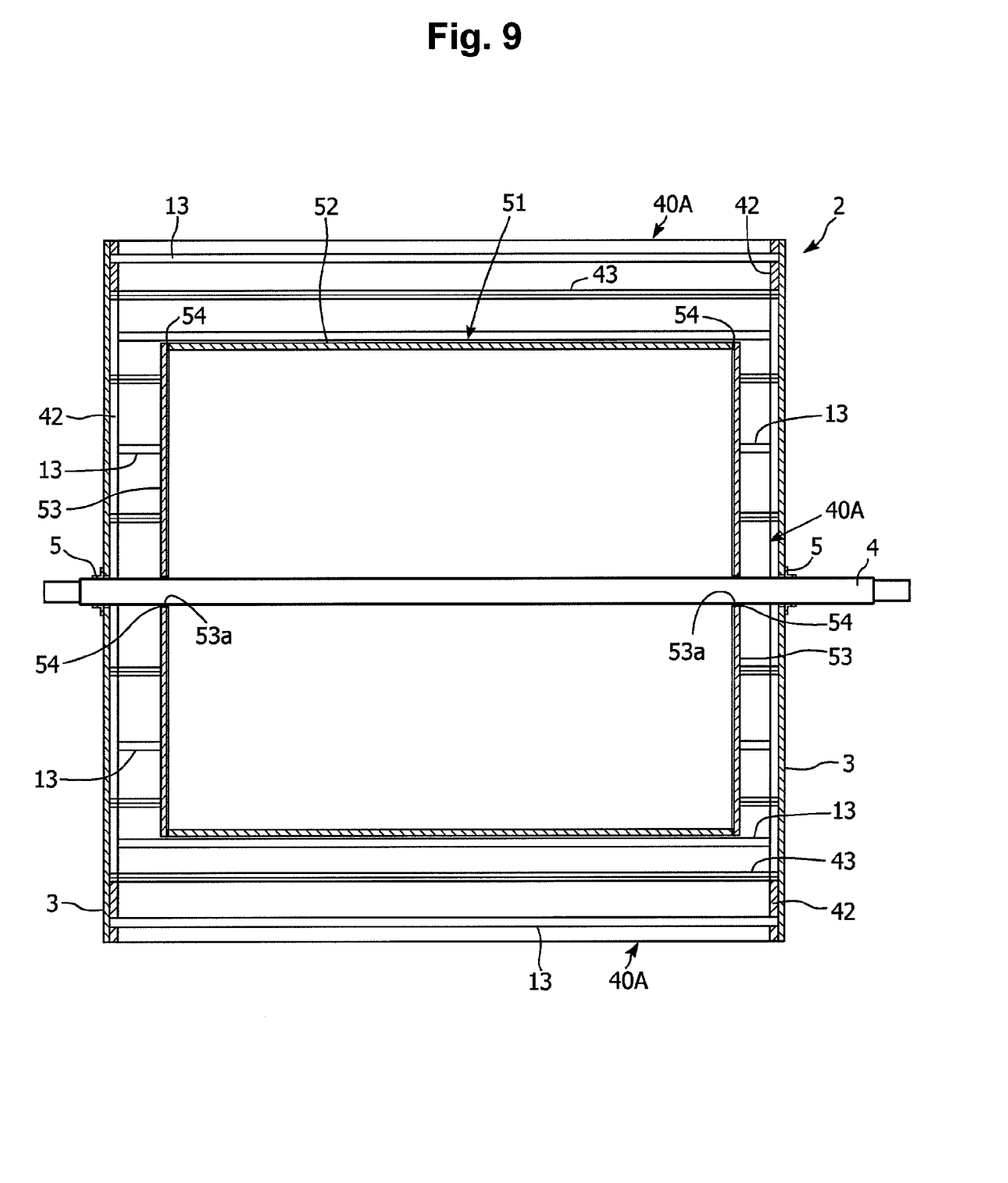
FIG. 9 is an enlarged view illustrating a rotor, a hermetically sealed structure, and a rotating shaft of the water wheel impeller blade type electric power generating apparatus according to the second embodiment of the present invention.

The water wheel impeller blade type electric power generating apparatus according to the second embodiment as shown in FIG. 8 has substantially the same basic configuration as that of the water wheel impeller blade type electric power generating apparatus according to the first embodiment as shown in FIG. 1, except that the rotor 1 is constituted by a drum body 2 which uses twelve trays 40A having substantially the same configuration as that of the tray 40 as shown in FIG. 6 except for the bottom plate 41 being eliminated, and connects these trays 40A in the shape of a cylinder so as to create a shape like a cylindrical cage as shown in FIG. 8 and FIG. 9, and a pair of side plates 3 which are fixed to both sides of this drum body 2, respectively, for pivotally supporting the support shafts 13, and that, in the inside of said rotor 1, a hermetically sealed structure 51 in the shape of a hollow cylindrical drum is connected to said rotating shaft 4 in a coaxial arrangement, and the other components are the same as those shown in FIG. 1.

Figure 10:
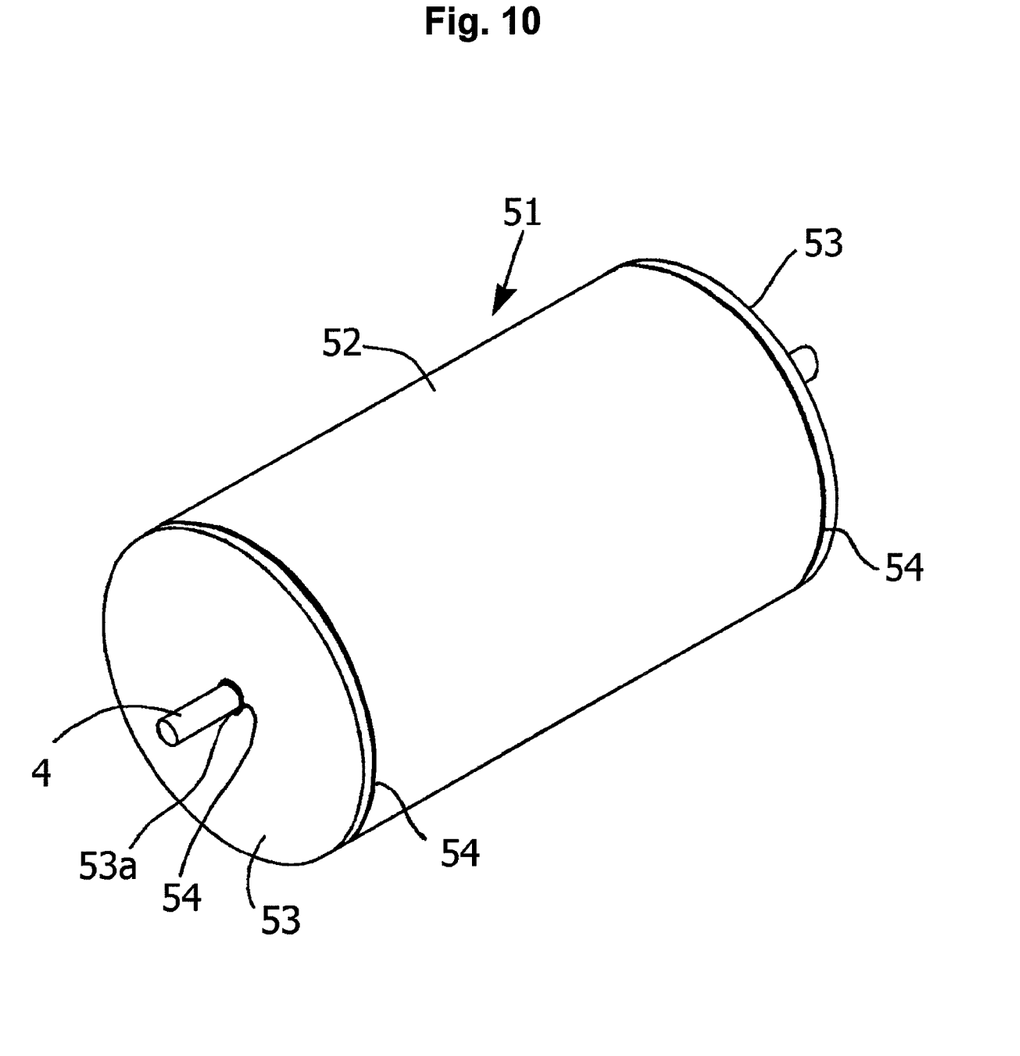
FIG. 10 is a schematic perspective view of the hermetically sealed structure.

As shown in FIG. 10, said hermetically sealed structure 51 includes a rotating cylindrical part 52 which is produced by rounding a metallic plate material, jointing the edges, and leaving both of the sides open, and a pair of rotating side plates 53 which are metallic and jointed to both sides of this rotating cylindrical part 52, said rotating shaft 4 being arranged such that it penetrates a through-hole 53a in the central portion of the pair of rotating side plates 53, and this hermetically sealed structure 51 is mounted to said rotating shaft 4 in a coaxial arrangement.

Further, said hermetically sealed structure 51 is designed such that it has a volume which causes the fluid to exert a buoyancy force equivalent to the total load imposed by rotating elements including said rotor 1 and impeller blades 10.

Still further, a sealing part 54 is provided for the jointing part of the rotating cylindrical part 52, the jointing part between the rotating side plate 53 and the rotating cylindrical part 52, and a portion between the rotating side plate 53 and the rotating shaft 4 to provide a hermetically sealed structure which prevents the fluid from entering the inside of said hermetically sealed structure 51.

With the water wheel impeller blade type electric power generating apparatus according to the second embodiment as illustrated in FIG. 8, once the present apparatus is fixed in place underwater or undersea such that the fluid guide plate 24 faces the flowing direction of fluid flow, A, the fluid guided by the fluid guide plate 24 and the fluid flowing under the fluid guide plate 24 are butted against the fluid receiving part 12 of the impeller blades 10 positioned under the rotating shaft 4, resulting in the rotor 1 and the rotating shaft 4 being rotated in the direction of arrow B.

The rotation of said rotating shaft 4 is transmitted to the input shaft 31 through the gears 32, 33 and the chain 34, thereby the generator 30 generating electric power.

With the present apparatus being fixed in place underwater or undersea, the fluid guided by the fluid guide plate 24 and the fluid flowing under the fluid guide plate 24 are led to the outer periphery (the outer periphery positioned on the lower side) of the hermetically sealed structure 51 which is mounted to said rotating shaft 4 in a coaxial arrangement, and the outer periphery positioned on the lower side is submerged in the fluid, thereby a buoyancy force of the fluid acting on the hermetically sealed structure 51.

As a result of this, the load which is imposed by said rotor 1 and the impeller blades 10 on the bearings 22 which pivotally support the rotating shaft 4 is reduced or practically eliminated, whereby heat generation of and damage to the bearings 22 can be avoided with the fluid energy loss being reduced, thus the durability of the bearings 22 can be improved, and the power generation efficiency for the water wheel impeller blade type electric power generating apparatus can be enhanced.

Further, the hermetically sealed structure 51 in the shape of a hollow cylindrical drum exerts advantageous effects of reducing the runout and the vibrations caused when the impeller blades 10 are turned.

The function and the advantageous effects of the rotor 1 using twelve trays 40A and said impeller blade 10 are the same as those as described above.

In addition, also with the water wheel impeller blade type electric power generating apparatus according to the second embodiment as illustrated in FIG. 8, the fluid receiving part 12 of the impeller blade 10 can, of course, be provided with a fluid receiving surface which is concaved in the shape of a circular arc, a letter V, or a trapezoid, or which is of a flat plane, and when any of these geometries is adopted, the same function and advantageous effects as described above can be provided.

Next, with reference to FIG. 11, a water wheel impeller blade type electric power generating apparatus according to a third embodiment of the present invention will be described.

Figure 11:
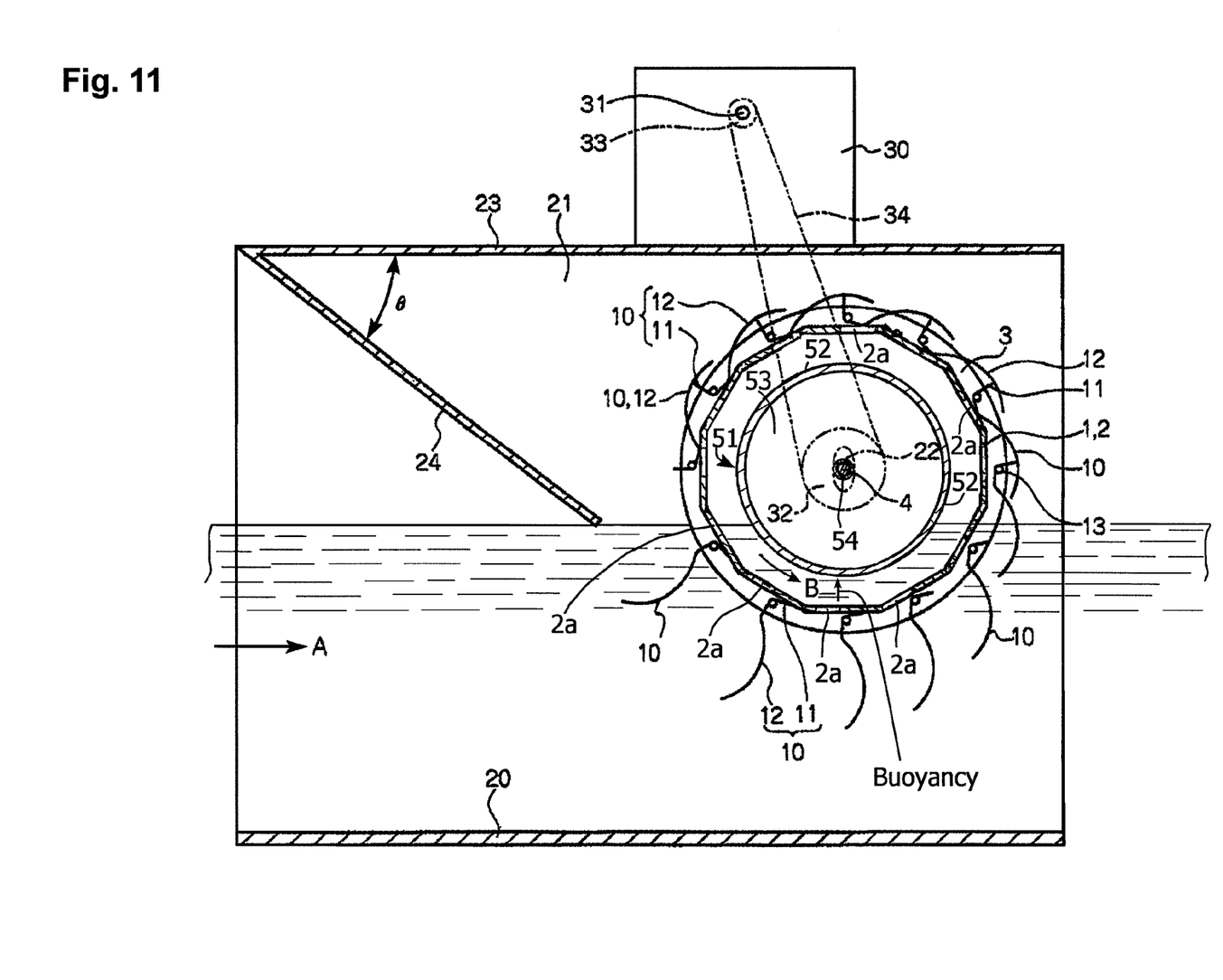
FIG. 11 is a sectional view illustrating the schematic configuration of a water wheel impeller blade type electric power generating apparatus according to a third embodiment of the present invention.

In FIG. 11, which illustrates the water wheel impeller blade type electric power generating apparatus according to the third embodiment, the same components as those of the above-described water wheel impeller blade type electric power generating apparatus according to the first embodiment as illustrated in FIG. 1 will be provided with the same symbols, and the detailed explanation of those will be omitted.

The water wheel impeller blade type electric power generating apparatus according to the third embodiment as shown in FIG. 11 has substantially the same configuration as that of the water wheel impeller blade type electric power generating apparatus according to the first embodiment as shown in FIG. 1, except that, in order to adapt the rotor 1 such that the fluid can flow therein, a drum body 2 which has a dodecahedral structure, constituting the rotor 1, is provided with an opening 2a in the shape of an elongated hole through which the fluid can flow, in, for example, twelve places along the axis of the rotating shaft 4, and that, in the inside of said rotor 1, a hermetically sealed structure 51 in the shape of a hollow cylindrical drum that is the same as described above is connected to said rotating shaft 4 in a coaxial arrangement, and the other components are the same as those shown in FIG. 1.

With the water wheel impeller blade type electric power generating apparatus according to the third embodiment as illustrated in FIG. 11, once the present apparatus is fixed in place underwater or undersea such that the fluid guide plate 24 faces the flowing direction of fluid flow, A, the fluid (water or seawater) guided by the fluid guide plate 24 and the fluid (water or seawater) flowing under the fluid guide plate 24 are butted against the fluid receiving part 12 of the impeller blades 10 positioned under the rotating shaft 4, resulting in the rotor 1 and the rotating shaft 4 being rotated in the direction of arrow B.

The rotation of said rotating shaft 4 is transmitted to the input shaft 31 through the gears 32, 33 and the chain 34, thereby the generator 30 generating electric power.

With the present apparatus being fixed in place underwater or undersea, the fluid guided by the fluid guide plate 24 and the fluid flowing under the fluid guide plate 24 enter into the rotor 1 through said opening part 2a, being led to the outer periphery (the outer periphery positioned on the lower side) of the hermetically sealed structure 51 which is mounted to said rotating shaft 4 in a coaxial arrangement, and the outer periphery positioned on the lower side is submerged in the fluid, thereby a buoyancy force of the fluid acting on the hermetically sealed structure 51.

As a result of this, the load which is imposed by said rotor 1 and the impeller blades 10 on the bearings 22 which pivotally support the rotating shaft 4 is reduced or practically eliminated, whereby heat generation of and damage to the bearings 22 can be avoided with the fluid energy loss being reduced, thus the durability of the bearings 22 can be improved, and the power generation efficiency for the water wheel impeller blade type electric power generating apparatus can be enhanced.

Further, the hermetically sealed structure 51 in the shape of a hollow cylindrical drum exerts advantageous effects of reducing the runout and the vibrations caused when the impeller blades 10 are turned.

With the water wheel impeller blade type electric power generating apparatus according to the third embodiment as shown in FIG. 11, the drum body 2 which is rotated by the fluid is provided with opening parts 2a, thus the quantity of the fluid which reaches the outer periphery of the hermetically sealed structure 51 is less than that with the water wheel impeller blade type electric power generating apparatus according to the second embodiment as shown in FIG. 8, however, by appropriately specifying the size of the opening part 2a, the buoyancy force as mentioned above can be developed.

In addition, also with the water wheel impeller blade type electric power generating apparatus according to the third embodiment as illustrated in FIG. 11, the fluid receiving part 12 of the impeller blade 10 can, of course, be provided with a fluid receiving surface which is concaved in the shape of a circular arc, a letter V, or a trapezoid, or which is of a flat plane, and when any of these geometries is adopted, the same function and advantageous effects as described above can be provided. In addition, the function and the advantageous effects of said impeller blade 10 are the same as those as described above.

INDUSTRIAL APPLICABILITY

The water wheel impeller blade type electric power generating apparatus of the present invention can be widely used as, for example, a small-output power generator which is installed in a small-scale river having a small volume of water, a power generator which is installed in a large-scale river having a large volume of water, and a power generator utilizing the ocean current.

DESCRIPTION OF SYMBOLS

1: Rotor
2: Drum body
2a: Opening part
3: Side plate
4: Rotating shaft
10: Impeller blade
11: Stopper part
12: Fluid receiving part
13: Support shaft
21: Side plate
23: Top plate
24: Fluid guide plate
30: Generator
32, 33: Gear
34: Chain
40: Tray
40A: Tray
41: Bottom plate
42: Side plate fixing part
43: Tray fixing part
44: Bolt insertion hole
45: Support shaft insertion hole
46: Bolt insertion hole
51: Hermetically sealed structure
52: Rotating cylindrical part
53: Rotating side plate
53a: Through-hole
54: Sealing part

What is claimed is:

1. A water wheel impeller blade electric power generating apparatus comprising:
a rotating shaft for transmitting motive power to a power generator, a rotor fixed to said rotating shaft, and an impeller blade provided on the outer periphery of said rotor to receive a flow of fluid for rotating said rotor,
said impeller blade being rotatable disposed on said rotor, and having a stopper part and a fluid receiving part extending from the stopper part and being longer than the stopper part,
said fluid receiving part being provided with a length large enough that when the impeller blade is thrust down the fluid receiving part covers a stopper part of an adjacent impeller blade,
a top plate constituting a frame body of the apparatus, and
a fluid guide plate connected to the top plate and inclined to guide the fluid to the impeller blades positioned under the rotating shaft of said rotor;
wherein
said rotor includes a drum body, and a plurality of side plates fixed to both ends, respectively, of said drum body,
said drum body includes a plurality of trays each accommodating an impeller blade support shaft,
said tray includes aside plate fixing parts folded from a bottom plate, the side plate fixing parts being fixed to the side plates, and (ii) tray fixing parts folded from said bottom plate, the tray fixing parts being fixed to respective adjacent trays, and
said side plate fixing part is fixed to said side plate with bolts and nuts, and said tray fixing part is fixed to the adjacent tray fixing part with bolts and nuts.

2. A water wheel impeller blade electric power generating apparatus comprising:
a rotating shaft pivotally supported by a frame body through bearings, transmitting motive power to a power generator;
a drum body having a shape like a cage, the drum body being constituted by a plurality of trays each accommodating an impeller blade support shaft, and the plurality of trays being connected to one another;
a rotor having a plurality of side plates pivotally supporting a support shaft, the side plates being fixed to both ends, respectively, of said drum body, and the rotor being fixed to said rotating shaft in a coaxial arrangement; and
a plurality of impeller blades being provided on the outer periphery of said rotor for rotating said rotor by receiving a flow of fluid, and being pivotally supported by said respective impeller blade support shafts,
inside said rotor, a hollow hermetically sealed structure being disposed integrally connected with said rotating shaft for developing a buoyancy force due to the fluid.

3. The water wheel impeller blade type electric power generating apparatus as stated in claim 2, wherein said fluid receiving part has a fluid receiving surface concaved in the shape of a circular arc, a letter V or a trapezoid.

4. A water wheel impeller blade electric power generating apparatus comprising:
a rotating shaft pivotally supported by a frame body through bearings, transmitting motive power to a power generator;
a drum body having a shape like a cage, the drum body being constituted by a plurality of trays each accommodating an impeller blade support shaft, and the plurality of trays being connected to one another;
a rotor having a plurality of side plates pivotally supporting a support shaft, the side plates being fixed to both ends, respectively, of said drum body, and the rotor being fixed to said rotating shaft in a coaxial arrangement; and
a plurality of impeller blades having a stopper part and a fluid receiving part extending from the stopper part and being longer than the stopper part, said fluid receiving part being provided with a length large enough that when the impeller blade is thrust down the fluid receiving part covers the stopper part of an adjacent impeller blade, and the plurality of impeller blades being rotatably disposed on said respective impeller blade support shafts on the outer periphery of said rotor for rotating said rotor by receiving a flow of fluid,
inside said rotor, a hollow hermetically sealed structure being disposed integrally connected with said rotating shaft, the hollow hermetically sealed structure being provided with a volume for causing the fluid to exert a buoyancy force equivalent to the total load imposed by rotating elements including the rotor and the impeller blades.

5. A water wheel impeller blade electric power generating apparatus comprising:
a rotating shaft pivotally supported by a frame body through bearings, transmitting motive power to a power generator;
a rotor having a hollow drum body and a plurality of side plates fixed to both ends, respectively, of said drum body, said drum body being provided with opening parts for allowing fluid to flow therein, and the rotor being fixed to said rotating shaft in a coaxial arrangement; and
an impeller blade provided on the outer periphery of said rotor to receive a flow of fluid for rotating said rotor,
inside said rotor, a hollow hermetically sealed structure being disposed integrally connected with said rotating shaft for developing a buoyancy force due to the fluid.

6. The water wheel impeller blade type electric power generating apparatus as stated in claim 5, wherein said fluid receiving part has a fluid receiving surface concaved in the shape of a circular arc, a letter V or a trapezoid.

7. A water wheel impeller blade electric power generating apparatus comprising:
a rotating shaft pivotally supported by a frame body through bearings, transmitting motive power to a power generator;
a rotor having a hollow drum body and a plurality of side plates fixed to both ends, respectively, of said drum body, said drum body being provided with opening parts for allowing fluid to flow therein, and the rotor being fixed to said rotating shaft in a coaxial arrangement; and
a plurality of impeller blades having a stopper part and a fluid receiving part extending from the stopper part and being longer than the stopper part, said fluid receiving part being provided with a length large enough that when the impeller blade is thrust down the fluid receiving part covers the stopper part of an adjacent impeller blade, and the plurality of impeller blades being rotatably disposed on the outer periphery of said rotor for rotating said rotor by receiving a flow of fluid,
inside said rotor, a hollow hermetically sealed structure being disposed integrally connected with said rotating shaft, the hollow hermetically sealed structure being provided with a volume for causing the fluid to exert a buoyancy force equivalent to the total load imposed by rotating elements including the rotor and the impeller blades.

* * * * *